United States Patent
Wang et al.

(10) Patent No.: US 9,185,849 B2
(45) Date of Patent: Nov. 17, 2015

(54) **METHOD OF CULTURING *ANTRODIA CINNAMOMEA***

(71) Applicant: Ling Sian Nano Biotechnology Pharmaceutical Co., Ltd., New Taipei (TW)

(72) Inventors: Po-Lun Wang, New Taipei (TW); Jung-Chi Hsieh, New Taipei (TW); Ting-Yuan Lai, New Taipei (TW); Jui-Lung Cheng, New Taipei (TW)

(73) Assignee: Po-Lun Wang, New Taipei (TW)

( * ) Notice: Subject to any disclaimer, the term of this patent is extended or adjusted under 35 U.S.C. 154(b) by 201 days.

(21) Appl. No.: 13/718,556

(22) Filed: Dec. 18, 2012

(65) Prior Publication Data

US 2014/0165458 A1    Jun. 19, 2014

(51) Int. Cl.
*C12N 1/14* (2006.01)
*A01G 1/04* (2006.01)

(52) U.S. Cl.
CPC ........................................ *A01G 1/04* (2013.01)

(58) Field of Classification Search
None
See application file for complete search history.

(56) References Cited

U.S. PATENT DOCUMENTS

| | | | |
|---|---|---|---|
| 7,838,264 B2 | 11/2010 | Wang et al. | |
| 8,122,636 B2 | 2/2012 | Chen et al. | |
| 2006/0251673 A1* | 11/2006 | Hwang et al. | 424/195.15 |

FOREIGN PATENT DOCUMENTS

| | | | |
|---|---|---|---|
| CN | 101507444 A | * | 8/2009 |
| CN | 102356728 | * | 6/2013 |
| VA | 22313-1450 | | 9/2010 |

OTHER PUBLICATIONS

Mascarin, G.M., Alves, S.B., and Lopes, R.B. "Culture Media Selection for Mass Production of Isaria fumosorosea and Isaria farinosa", Brazilian Archives of Biology and Technology 2010, vol. 53, pp. 753-761.*

Wang, L., and Yang, S.-T., "Solid State Fermentation and Its Applications", In Bioprocessing for Value-Added Products from Renewable Resources, Chapter 18; Yang, S-T., Ed.; Elsevier: Oxford, UK, 2007; pp. 465-489.*

* cited by examiner

*Primary Examiner* — Allison Fox
*Assistant Examiner* — Michelle F Paguio Frising
(74) *Attorney, Agent, or Firm* — Muncy, Geissler, Olds & Lowe, P.C.

(57) ABSTRACT

A solid medium of *Antrodia cinnamomea* comprises 20 to 50 wt % soybean; 30 to 50 wt % coixseed; and 20 to 50 wt % sorghum. A culturing method of *Antrodia cinnamomea*, comprises providing a solid medium comprising soybean, coixseed and sorghum; preparing a solution of *Antrodia cinnamomea*, inoculating the solution of *Antrodia cinnamomea* on the solid medium in a concentration of $1\times10^3$ to $1\times10^6$ cfu on per 100 g of solid medium, and statically culturing the solution of *Antrodia cinnamomea* on the solid medium till obtaining hyphae adhered on the solid medium; and culturing the solution of *Antrodia cinnamomea* by intermittent shaking in a frequency of every 5 to 7 days shaking 5 to 10 minutes, with a period of the culturing by intermittent shaking being more than 40 days.

6 Claims, No Drawings

METHOD OF CULTURING *ANTRODIA CINNAMOMEA*

BACKGROUND OF THE INVENTION

1. Field of the Invention

The present invention relates to a solid medium and a culturing method of *Antrodia cinnamomea* and, more particularly, to a solid medium of *Antrodia cinnamomea* which is capable of promoting the content of triperpenoids in obtained *Antrodia cinnamomea* thereon and a culturing method thereby with said solid medium.

2. Description of the Related Art

*Antrodia cinnamomea* is a genus of fungi in the family Fomitopsidaceae, and which is found on *Cinnamomum kanehirae* in temperate and boreal forests. *Antrodia cinnamomea* is a precious and endemic medical material in Taiwan, being rich in active substances, such as triterpenoids being effective on anti-cancer, hepatoprotection and lowering blood pressure and polysaccharide as inflammation modulator.

Due to the scarcity of *Antrodia cinnamomea*, it is not easy to obtain *Antrodia cinnamomea*, as well as the active substances therein. In conventional art, the *Antrodia cinnamomea* is generally planted by (a) basswood cultivation method; (b) solid cultivation method; and (c) liquid fermentation method, so as to obtain hyphae of *Antrodia cinnamomea* and to further extract the active substances from those hyphae.

The basswood cultivation method uses dead basswood of *Antrodia cinnamomea* as a matrix, by implanting and culturing the *Antrodia cinnamomea* in the basswood of *Antrodia cinnamomea*, and then, collecting grown fruiting bodies of *Antrodia cinnamomea* thereon. However, the basswood cultivation method has to be carried out in a time-and-cost-consuming process, since a preferable temperature and a longer culturing time are required to the *Antrodia cinnamomea* in the basswood cultivation method. Hence, the basswood cultivation method is inconvenient in industrial manufacture of the *Antrodia cinnamomea*.

In the solid cultivation method, the *Antrodia cinnamomea* is implanted and culturing in a space package comprising nutrients, particular in a matrix (generally consisted of sawdust, humus and other organic ingredients) of the space package. With such, it is capable of obtaining fruiting bodies of the *Antrodia cinnamomea*, in a similar shape to wild *Antrodia cinnamomea*. However, obtained fruiting bodies of the *Antrodia cinnamomea* in the solid cultivation method is poor in fermentation, with said obtained fruiting bodies containing only a small amount of triperpenoids.

The liquid fermentation method is performed by using a liquid medium, so that liquid fermentations of the *Antrodia cinnamomea* can be conducted in the liquid medium. Accordingly, a significant amount of fermentation produces can be provided in a short time. However, the liquid fermentation method only contributes to promote first metabolite (such as polysaccharide) but secondary metabolite (triterpenoids), since a shorter fermentation time and a worse fermentation condition thereof. Therefore, the liquid fermentation method is limited in producing *Antrodia cinnamomea* being rich in triperpenoids.

In summary, said conventional cultivation methods all have problem in obtaining *Antrodia cinnamomea* that is rich in triperpenoids. Also, said conventional cultivation methods have to be performed in a time-and-cost-consuming process. Thus, it is a need to improve the conventional cultivation method.

SUMMARY OF THE INVENTION

An objective of the present invention is to provide a solid medium of *Antrodia cinnamomea*, which comprises corns being easy to obtain, so as to be frugal in cost.

Another objective of the present invention is to provide a culturing method of *Antrodia cinnamomea* which is capable of promoting the contents of triperpenoids in obtained *Antrodia cinnamomea*.

A further objective of the present invention is to provide a culturing method of *Antrodia cinnamomea*, which can obtain hyphae of *Antrodia cinnamomea* in a shorter culturing time.

The present invention fulfills the above objectives by providing a solid medium of *Antrodia cinnamomea* comprising: 20 to 50 wt % soybean; 30 to 50 wt % coixseed; and 20 to 50 wt % sorghum, preferably, with the soybean being 50 wt %, the coixseed being 30 wt % and the sorghum being 20 wt %, and with the soybean, the coixseed and the sorghum being soaked in water.

The present invention also fulfills the above objectives by providing a culturing method of *Antrodia cinnamomea*, comprising: providing a solid medium comprising soybean, coixseed and sorghum; preparing a solution of *Antrodia cinnamomea*, inoculating the solution of *Antrodia cinnamomea* on the solid medium in a concentration of $1 \times 10^3$ to $1 \times 10^6$ cfu on per 100 g of solid medium, and statically culturing the solution of *Antrodia cinnamomea* on the solid medium till obtaining hyphae adhered on the solid medium; and culturing the solution of *Antrodia cinnamomea* by intermittent shaking in a frequency of every 5 to 7 days shaking 5 to 10 minutes, with a period of the culturing by intermittent shaking being more than 40 days.

Preferably, the solid medium is provided by comprising 20 to 50 wt % soybean, 30 to 50 wt % coixseed, and 20 to 50 wt % sorghum, and 50 wt % soybean, 30 wt % coixseed, and 20 wt % sorghum in particular.

Preferably, the soybean, coixseed, and sorghum are soaked in water for 20 to 80 minutes and then mixed with each other to obtained the solid medium in the step of providing, and a concentration of the solution of *Antrodia cinnamomea* is in $1 \times 10^3$ to $1 \times 10^6$ cfu/ml in the step of preparing.

Preferably, a period of the culturing is 4 to 5 day, with the solution of *Antrodia cinnamomea* adhering and culturing on the solid medium, and a period of intermittent shaking is 40 to 90 days.

The present invention will become clearer in light of the following detailed description of illustrative embodiments of this invention described in connection with the drawings.

DETAILED DESCRIPTION OF THE INVENTION

A preferable embodiment of the present patent invention refers to a culturing method of *Antrodia cinnamomea*, comprising steps of: providing a solid medium; preparing a solution of *Antrodia cinnamomea*; and culturing the solution of *Antrodia cinnamomea* sequentially by statically culturing and intermittent shaking.

In the step of providing a solid medium, the solid medium is prepared, with the solid medium being consisted of soybean, coixseed, and sorghum, preferably consisted of 20 to 50% soybean, 30 to 50% coixseed, and 20 to 50% sorghum. Precisely, the soybean, the coixseed, and the sorghum used in the preferable embodiment of the present patent invention are in a shape of a granule, providing a supporting for hyphae of *Antrodia cinnamomea* as it is cultured in the solid medium. In such, air and moisture are easy to penetrate in the solid medium, and to promote the growth of the hyphae of *Antrodia*

*cinnamomea* since plenty of apertures are existed between the soybean, the coixseed, and the sorghum. Preferably, the preferable embodiment of the present patent invention further comprises a step of soaking performed before the step of providing a solid medium, by soaking the soybean, the coixseed, and the sorghum in water for 20 to 80 minutes, 30 minutes in particular. Thus, covers of the soybean, the coixseed, and the sorghum are softened and easy to be penetrated by the hyphae of *Antrodia cinnamomea*. Also, the solid medium and containers thereof are preferable sterilized before the following steps are carried out.

In the step of preparing a solution of *Antrodia cinnamomea*, a solution of *Antrodia cinnamomea* is prepared and inoculated on the solid medium, with each 100 g of the solid medium having $1 \times 10^3$ to $1 \times 10^6$ cfu of *Antrodia cinnamomea*. The solution of *Antrodia cinnamomea* is cultured on the solid medium till to obtain hyphae thereform. The *Antrodia cinnamomea* inoculated in the present step can be selected from *Antrodia cinnamomea* that purchased from Bioresource Collection and Research Center of Food Industry Research and Development Institute (Taiwan, R.O.C), numbered as BCRC 35396T, BCRC35398, BCRC35716, BCRC36401, BCRC36711, BCRC 36795, BCRC 37848, BCRC37849 or BCRC37850 but not limit to them. Preferable, the *Antrodia cinnamomea* is pre-cultured in a potato dextrose broth (PDB broth) till to reach to a concentration of $1 \times 10^5$ to $1 \times 10^6$ cfu/ml, keeping cultured *Antrodia cinnamomea* at an active stage. More specifically, to allow a significant amount of space and nutrients can be obtained by the *Antrodia cinnamomea*, the solution of *Antrodia cinnamomea* is inoculated on the solid medium at a concentration of $1 \times 10^3$ to $1 \times 10^4$ cfu/ml per 100 g of solid medium. Further, the solution of *Antrodia cinnamomea* can be inoculated on the solid medium directly through spraying or dropping on surfaces of the solid medium, followed by uniformly shaking. In a preferable embodiment of the present patent application, *Antrodia cinnamomea* is preferably statically culturing for 4 to 5 days, for obtaining hyphae.

After the statically culturing, the *Antrodia cinnamomea* is further cultured by intermittent shaking at a frequency of every 5 to 7 days shaking 5 to 10 minutes, with a period of the culturing by intermittent shaking being more than 40 days. In specifically, hyphae of the *Antrodia cinnamomea* obtained in the statically culturing will evenly spread on the solid medium during the intermittent shaking in the present step. In such, the *Antrodia cinnamomea* is capable of obtaining enough nutrients from the solid medium entirely. Also, it is preferably for the *Antrodia cinnamomea* to be cultured by intermittent shaking in the period of more than 40 days, so that a great amount of triterpenoids are produced due to secondary metabolism. More preferably, the *Antrodia cinnamomea* is preferably cultured by intermittent shaking in the period of 40 to 90 days, so as to produce a higher amount of triterpenoids therefrom. In the preferable embodiment, the intermittent shaking can be performed by hand shaking, with hyphae being spread evenly on the solid medium through the shaking.

For proving said culturing method of *Antrodia cinnamomea* truly having efficacies on promoting active substances in obtained *Antrodia cinnamomea*, a following trial is carried out by preparing and pre-culturing the strain of *Antrodia cinnamomea*, BCRC 35398, to obtain a solution of *Antrodia cinnamomea*, and further inoculating the solution of *Antrodia cinnamomea* in various solid mediums (as listed in TABLE 1, including A1, A2 and A3). In the pre-culturing, the strain of *Antrodia cinnamomea* is cultured in a potato dextrose agar at 26±2° C. till hyphae of *Antrodia cinnamomea* have full of the potato dextrose agar (around 2 to 3 days of culturing). Then, the hyphae of *Antrodia cinnamomea* in 0.5 to 1.0 g weight are further cultured at 30 ml potato dextrose broth for another 2 days, in order to obtain the solution of *Antrodia cinnamomea* in a concentration of $2 \times 10^5$ cfu/ml.

TABLE 1

Formulas and Culturing Efficacy of Each Solid Medium

| Solid Mediums | Soybean:Coixseed:Sorghum | Soluble Polysaccharide | Triterpenoids |
|---|---|---|---|
| A1 | 5:3:2 | 32.5% | 20.0 mg/g |
| A2 | 2:3:5 | 22.43% | 12.97 mg/g |
| A3 | 3:5:2 | 13.67% | 5.24 mg/g |

As following, the solution of *Antrodia cinnamomea* is inoculated to said solid mediums as list in TABLE 1 (including A1, A2 and A3), with each solid medium being 600 g in weight and comprising soybean, coixseed, and sorghum in various weight ratios respectively. In the present trial, each solid medium is contained in a sterilized flask covered by a cork or a gas-permeable tampon, and sterilized before the inoculating. Then, 10 ml of the solution of *Antrodia cinnamomea* is inoculated to each solid medium respectively and statically cultured at 26±2° C. for 4 to 5 days, in order to avoid rolling of soybean, coixseed, and sorghum and to make sure the hyphae of *Antrodia cinnamomea* being adhered to each solid medium and grown thereon. After that (after 5 days of statically culturing), the flashes contained each solid medium are hand-shaken respectively from up to down at a frequency of every 5 to 7 days shaking 5 to 10 minutes in 90 days. In this way, obtained hyphae of *Antrodia cinnamomea* on each solid medium can evenly contain to surfaces of the solid mediums, with each solid medium performing in a preferable condition for metabolism, so as to facilitate the secondary metabolism of obtained hyphae of *Antrodia cinnamomea* on each solid medium. As a result, a significant amount of active substances, such as soluble polysaccharide and triterpenoids is produced in the obtained hyphae of *Antrodia cinnamomea* on each solid medium. In the present trial, the obtained hyphae of *Antrodia cinnamomea* on each solid medium are finally collected from each solid medium, undergone drying and grinding to powder. Finally, contents of the obtained hyphae of *Antrodia cinnamomea* from each solid medium, including soluble polysaccharide and triterpenoids, are analyzed and recorded in TABLE 1.

With reference to TABLE 1, it is noted that the solid medium (A1 in particular), as well as the culturing method as described in the preferable embodiment of the present invention, are capable of obtaining hyphae of *Antrodia cinnamomea* that is rich in soluble polysaccharide and triterpenoids.

In summary, through the present invention, an easy-to-obtained and frugal-in-cost solid medium is provided to culturing *Antrodia cinnamomea*, with the solid medium providing supporting, and enough air, moisture and nutrients in need as the hyphae of the *Antrodia cinnamomea* are grown. Furthermore, a culturing method is also provided, culturing the *Antrodia cinnamomea* on the said solid medium via statically culturing and shaking culturing, so as to make sure obtained hyphae of the *Antrodia cinnamomea* being evenly distributed on surfaces of the solid medium and performed secondary metabolism. In such, the said solid medium and the culturing method are all capable of promoting the contents of triterpenoids and soluble polysaccharide in obtained *Antrodia cinnamomea*.

In this way, the solid medium of *Antrodia cinnamomea* of the preferable embodiment of the present patent invention is more frugal in cost in comparison with conventional cultivation methods, since easily obtained crops are used in said solid medium of *Antrodia cinnamomea*. On the other hand, the culturing method of *Antrodia cinnamomea* of the preferable embodiment of the present patent invention is preferable in promoting metabolism of obtained hyphae of *Antrodia cinnamomea* and increasing contents of active substances (for example triperpenoids) in obtained hyphae of *Antrodia cinnamomea* through a shorter culturing time.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A culturing method of *Antrodia cinnamomea*, comprising:
   (a) providing a solid medium consisting of 20-50 wt % soybean, 30-50 wt % coixseed and 20-50% sorghum;
   (b) preparing a solution of *Antrodia cinnamomea*;
   (c) inoculating the solution of *Antrodia cinnamomea* on the solid medium in a concentration of $1\times10^3$ to $1\times10^6$ cfu per 100 g of solid medium;
   (d) statically culturing the solution of *Antrodia cinnamomea* on the solid medium until hyphae adhere on the solid medium; and
   (e) culturing the statically cultured solution of *Antrodia cinnamomea* with intermittent shaking every 5 to 7 days for a period of 5 to 10 minutes, wherein the culturing is carried out for more than 40 days.

2. The culturing method of *Antrodia cinnamomea* as claimed in claim 1, wherein the solid medium consists 50 wt % soybean, 30 wt % coixseed, and 20 wt % sorghum.

3. The culturing method of *Antrodia cinnamomea* as claimed in claim 1, wherein step (a) comprises soaking the soybean, coixseed, and sorghum in water for 20 to 80 minutes and then mixing with each other to obtain the solid medium.

4. The culturing method of *Antrodia cinnamomea* as claimed in claim 1, wherein step (b) comprises providing *Antrodia cinnamomea* at a concentration of $1\times10^3$ to $10^6$ cfu/ml.

5. The culturing method of *Antrodia cinnamomea* as claimed in claim 1, wherein step (d) is performed for a period of 4 to 5 days, with the solution of *Antrodia cinnamomea* being adhered and grown on the solid medium.

6. The culturing method of *Antrodia cinnamomea* as claimed in claim 1, wherein step (e) is carried out for a period of 40 to 90 days.

* * * * *